United States Patent [19]

Fochler

[11] Patent Number: 4,955,813

[45] Date of Patent: Sep. 11, 1990

[54] MULTI-PRONGED THUMBTACK

[76] Inventor: Stephen H. Fochler, 95 Greentree Rd., Chagrin Falls, Ohio 44022

[21] Appl. No.: 410,510

[22] Filed: Sep. 21, 1989

[51] Int. Cl.[5] .................... F16B 15/00

[52] U.S. Cl. .................... 411/457; 411/469; 411/473; 411/923

[58] Field of Search .................... 411/457, 470, 473, 480, 411/923, 469

[56] References Cited

U.S. PATENT DOCUMENTS

| | | | |
|---|---|---|---|
| 1,991,561 | 2/1935 | Krantz | 411/473 |
| 3,205,757 | 9/1965 | Kuennen | 411/473 |
| 4,525,115 | 6/1985 | Garner, Sr. | 411/457 |

FOREIGN PATENT DOCUMENTS

| | | | |
|---|---|---|---|
| 999557 | 10/1951 | France | 411/457 |
| 11135 | of 1892 | United Kingdom | 411/457 |

*Primary Examiner*—Neill R. Wilson
*Attorney, Agent, or Firm*—Laney, Dougherty, Hessin & Beavers

[57] ABSTRACT

A multi-pronged thumbtack which includes a head and a plurality of tines projecting from the head in the same direction to assure that paper impaled upon the tines will not be able to rotate around the axis of any one of the tines. In general, the head has at least one monoplanar side from which the tines extend codirectionally, and three tines are preferably disposed at the corners of an equilateral triangle.

2 Claims, 1 Drawing Sheet

MULTI-PRONGED THUMBTACK

FIELD OF THE INVENTION

This invention relates to a multiple-pronged thumbtack.

BACKGROUND OF THE INVENTION

Thumbtacks have generally consisted of a head having a single tine projecting from the head and used to impale a paper document or flexible exhibit sheet of some type to a surface so as to display the impaled paper or document for visual scrutiny. A problem which is characterized by thumbtacks of this type is that the paper or document can rotate around the axis of the single tine of the thumbtack. Moreover, any force applied to the lower portion of the paper or document below the single tine tends to cause a tear to occur through the body of the paper, along the axis of the tine so as to detach the paper from the thumbtack.

BRIEF DESCRIPTION OF THE PRESENT INVENTION

The present invention provides a multiple-pronged thumbtack which includes a head with a substantially monoplanar surface at one side of the head, and having a plurality, and preferably three, pointed tines extending from the monoplanar surface of the head at spaced locations thereon. Preferably, three tines are located at the corners of an imaginary triangle since this gives a better distribution of the load of the paper and any weight or force which may be applied to the paper or document tacked by the thumbtack, and tending to pull it vertically downwardly.

The preferred three-pronged or three-tined thumbtack can be made of metal, or plastic, or partly of metal and partly of plastic, or even partly of a heavy cardboard with the tines made of metal or plastic.

An important object of the invention is to provide an improved thumbtack having a plurality of three spaced tines for distribution of the weight or force applied through a document or paper supported by the thumbtack to the tines, to thereby provide better holding power and prevent rotation of the documents about the axis of a single tine, as in conventional thumbtacks.

A further object of the invention is to provide a thumbtack which is aesthetic in appearance, and is very effective in its function of retaining in a tacked location, a document which is to be viewed or scrutinized.

Additional objects and advantages of the invention will become apparent as the following detailed description of the invention is read in conjunction with the accompany drawings which illustrate the invention.

GENERAL DESCRIPTION OF THE DRAWINGS

DETAILED DESCRIPTION OF PREFERRED EMBODIMENTS OF THE INVENTION

Figure 1:
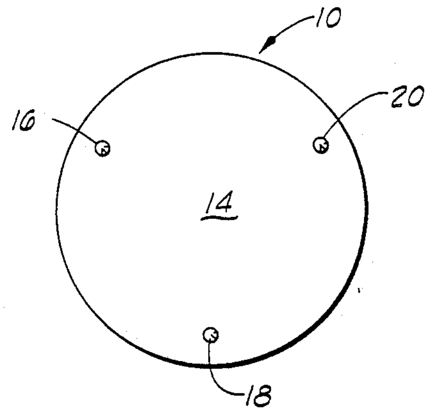
FIG. 1 is a bottom plan view of a thumbtack constructed in accordance with the present invention.
Figure 2:
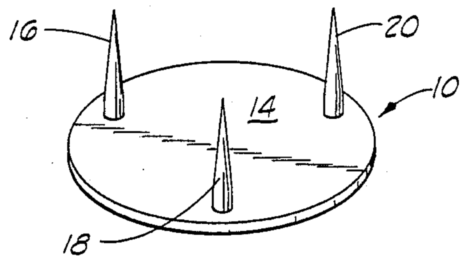
FIG. 2 is a perspective view of a three-pronged thumbtack constructed in accordance with a preferred embodiment of the present invention, and showing the opposite side of the embodiment of the thumbtack from that which is shown in FIG. 1.

Referring initially to FIGS. 1 and 2 of the drawings, this first embodiment of the thumbtack of the invention includes a flat disc-shaped head 10 which has a monoplanar top or upper surface, and a monoplanar, flat inner surface 14. The outer periphery of the head is circular. Three prongs or tines 16, 18 and 20 project in the same direction from the monoplanar inner surface 14, and extend along substantially parallel axes with respect to each other. The tines or prongs 16, 18, and 20 are spaced equally from each other, or, stated differently, have their points of securement, and their free sharpened or pointed ends located at the apices of an equilateral triangle.

The material of construction of the thumbtack of the invention, and specifically of the form of the thumbtack shown in FIGS. 1 and 2, can vary. In a preferred embodiment of the invention, the head 10 of the thumbtack is made of metal as are the tines or prongs 16, 18 and 20. The entire unit can, however, be molded from a synthetic resin.

Figure 3:
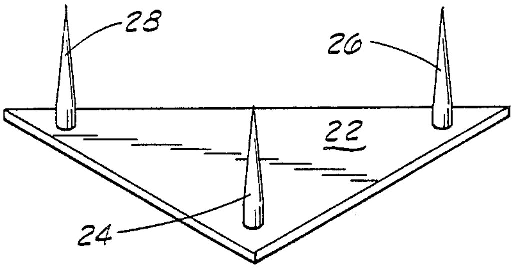
FIG. 3 is a perspective view of a second embodiment or the three-pronged thumbtack of the invention.

A second embodiment of the invention is depicted in FIG. 3 of the drawings. In the case of this embodiment, the head of the thumbtack is a flat triangular plate 22 having the three prongs or tines 24, 26 and 28 located at the three corners of the plate. The plate 22 is preferably in the form of an equilateral triangle so that the tines, when attached at each corner, are equally spaced from each other. Again, the material of construction can be metal, or plastic, or a combination thereof in which the head is made of plastic and the tines are metal spikes.

Figure 4:
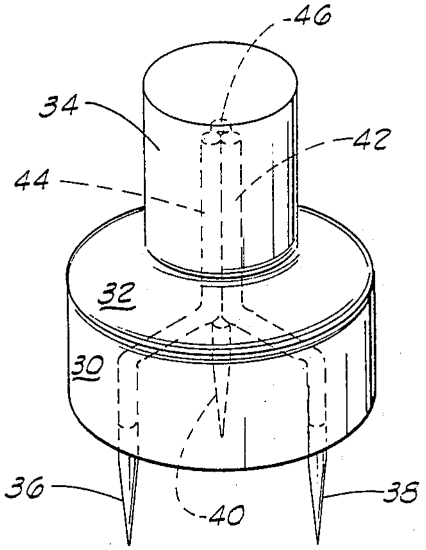
FIG. 4 is a perspective view of yet another, or third, embodiment of the three-pronged thumbtack of the invention.

A third embodiment of the invention is illustrated in FIG. 4 of the drawings. In this form of the thumbtack, the head of the thumbtack includes a generally cylindrical base portion 30 which is radiused inwardly through a shoulder 32 to a projecting neck portion 34. A preferred construction for this embodiment of the thumbtack requires that the head, including the base portion 30 and the neck portion 32, be molded as an integral unit from a suitable synthetic resin. The prongs or tines used in the embodiment of the invention depicted in FIG. 4 are made of metal and are embedded in the plastic head. The three tines 36, 38 and 40 are joined through centrally located contiguous shafts 42, 44 and 46 which, in a preferred construction of the invention are embedded in the plastic head. The tines 36, 38 and 40 are equally spaced from each other.

Figure 5:
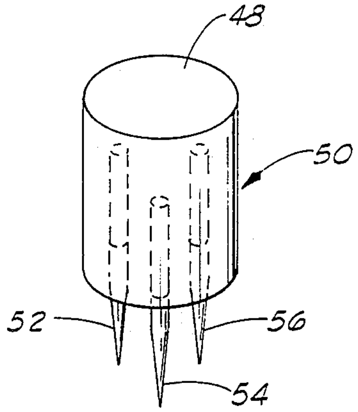
FIG.5 is a perspective view of yet another embodiment of the three-pronged thumbtack of the invention.

Yet, another embodiment of the invention is illustrated in FIG. 5 of the drawings. Here, the head 50 of the thumbtack is cylindrical in configuration, and has a pair of opposed, substantially planar end faces 48 which extend parallel to each other at opposite ends of cylindrical head 50. The head 50, in the shape described, can be formed of metal, wood or plastic, but is preferably constructed of a synthetic resin. Where the head is constructed of wood or a synthetic resin, three, spaced tines or prongs 52, 54 and 56 which it carries have shank portions which are embedded in the wood or synthetic resin head, so that the tines or prongs are spaced equally from each other and project substantially parallel to each other.

Although a preferred embodiment of the invention has been herein described in order to illustrate the principles of the invention, as such principles are embodied in several forms, it will be understood that other forms of the thumbtack of the invention can be rate the described principles. For example, thumbtacks having two tines or more than three tines, can also be constructed in accordance with such principles. Such forms are deemed to be within the spirit and scope of the invention, except as the same may necessarily be circumscribed and limited by the appended claims, even when the same are liberally interpreted.

What is claimed is:

1. A thumbtack which comprises:

a flat plate head configured as an equilateral triangle and having opposed, substantially parallel monoplanar surfaces at opposite sides of said plate; and three, substantially parallel tines extending from the respective vertices of said flat plate triangular head in a direction which is substantially perpendicular to said parallel monoplanar surfaces.

2. A thumbtack which comprises:

a synthetic resin head comprising:

a generally cylindrical base portion having a substantially monoplanar surface at one side thereof;

a generally cylindrical neck portion of smaller diameter than said base portion projecting from the opposite side of said base portion from the side at which said monoplanar surface is located; and a shoulder between said neck portion and said base portion; and three metallic tines including three portions having substantially parallel axes projecting from said monoplanar side of the base portion of said head, and projecting in a direction which is substantially perpendicular to said monoplanar surface, each of said tines having a generally L-shaped portion embedded in said base portion of said synthetic resin head, and said tines collectively further including three centrally located contiguous shaft portions extending from said L-shaped portions and embedded in said generally cylindrical neck portion of said synthetic resin head.

* * * * *

UNITED STATES PATENT AND TRADEMARK OFFICE

CERTIFICATE OF CORRECTION

PATENT NO. : 4,955,813

DATED : September 11, 1990

INVENTOR(S) : Stephen H. Fochler

It is certified that error appears in the above-identified patent and that said Letters Patent is hereby corrected as shown below:

In Column 3, line 2, delete "rate" and insert -devised, and can incorporate-.

Signed and Sealed this

Seventh Day of January, 1992

*Attest:*

HARRY F. MANBECK, JR.

*Attesting Officer*

*Commissioner of Patents and Trademarks*